E. T. JONES.
TELEPHONE BRACKET.
APPLICATION FILED APR. 4, 1918.
1,288,611.
Patented Dec. 24, 1918.
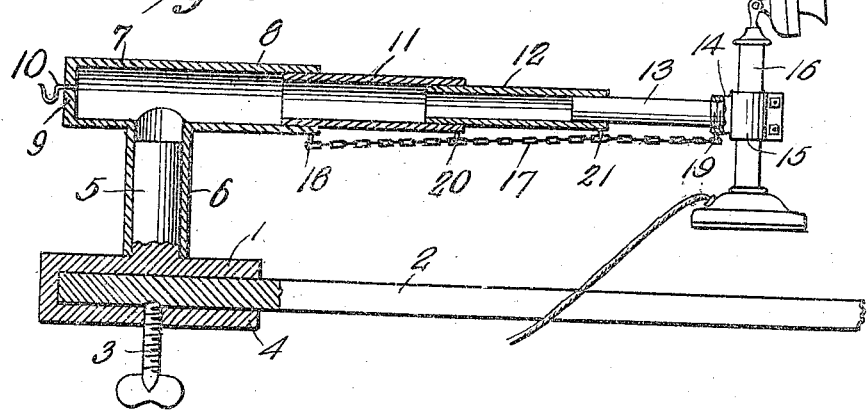
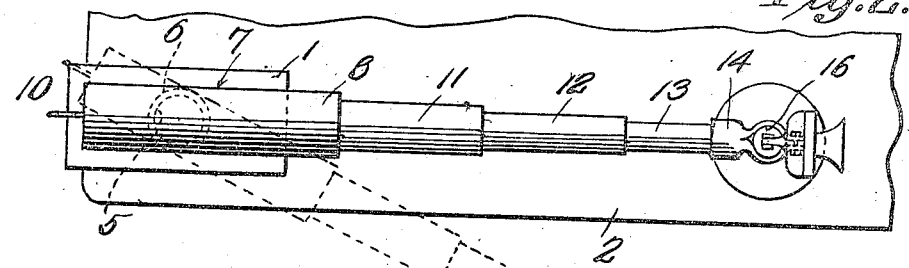
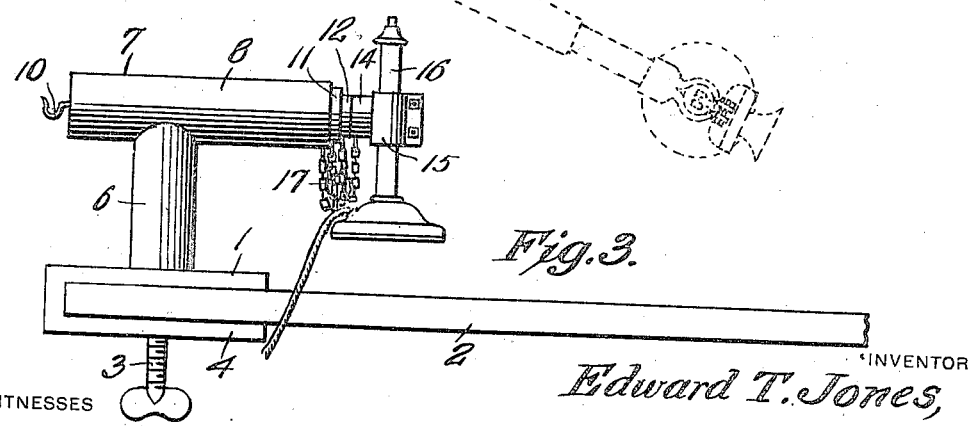
WITNESSES
James F. Crown
H. H. Babcock
INVENTOR
Edward T. Jones,
BY Richard B. Owen,
ATTORNEY

UNITED STATES PATENT OFFICE.

EDWARD T. JONES, OF NEW ORLEANS, LOUISIANA.

TELEPHONE-BRACKET.

1,288,611.  Specification of Letters Patent.  Patented Dec. 24, 1918.

Application filed April 4, 1918. Serial No. 226,677.

*To all whom it may concern:*

Be it known that I, EDWARD T. JONES, a citizen of the United States, residing at New Orleans, in the parish of Orleans and State of Louisiana, have invented certain new and useful Improvements in Telephone-Brackets, of which the following is a specification.

This invention relates to brackets, and more particularly to a bracket especially adapted to support a telephone or similar instrument.

One of the main objects of the invention is to provide a bracket of simple construction and operation which may be produced at very small cost and which does not require the use of special machinery in its manufacture. Another object is to provide a bracket of telescoping construction which may be readily applied to an office desk or similar article of furniture and, when not in use, may be telescoped or folded so as to occupy but very little space. A further object is to provide a bracket in which the telescoping members of the supporting arm have their outward movement relative to each other positively limited so as to insure proper rigidity when in extended position. Further objects will appear from the detailed description.

In the drawings:

Figure 1 is a central sectional view through a bracket constructed in accordance with my invention as applied, Fig. 2 is a top plan view, Fig. 3 is a side view of the bracket in folded or telescoped condition.

A substantially U-clamp 1 is adapted to be secured to the top 2 of a desk or other suitable article of furniture by means of a clamp screw 3 which is threaded through the lower arm 4 of the clamp. This clamp is provided with a standard 5 which is adapted to receive the vertical arm or shank 6 of a T 7 of tubular construction. Arm 6 fits snugly over standard 5 so as to prevent all looseness or play between the standard while permitting the T to be readily turned about the standard. The tubular head 8 of the T is closed at one end, as at 9, and receives a hook 10 secured therein for supporting a telephone directory so as to render the same readily available. A tubular member 11 fits snugly in head 8 so as to be slidable therein and receives in turn a tubular member 12 which slidably receives a smaller tubular member 13. The head 8 and members 11, 12 and 13 constitute a telescoping supporting arm for supporting the telephone in position. A T 14 is threaded on the outer end of member 13, the head 15 of this T being in the form of a split clamp which is adapted to receive and secure the telephone instrument 16. The instrument is thus readily secured to the supporting arm so as to be carried thereby. A stop member or chain 17 is secured at its inner end to an eye 18 carried by head 8 of T member 7 adjacent the open end thereof, the outer end of this chain being secured to an eye 19 carried by the stem of T 14. The chain is also secured by eyes 20 and 21 to the members 11 and 12, respectively, adjacent the forward ends thereof. This chain acts to positively limit the outward movement of the telescoping members of the supporting arm so as to prevent complete withdrawal thereof, and also insures that these members, when extended to their greatest degree will project sufficiently within each other so as to insure proper rigidity of the supporting arm thus formed. The eye of each member abuts against the end of the next larger member when the parts are collapsed as seen in Fig. 3, and therefore these eyes serve as stops to prevent the undesirable assembly of the small members with the larger, as is possible because the head 8 of the T is longer than any of the members.

When the instrument 16 is in use, the members 13, 12 and 11 may be forced inwardly into the head 8 of T 7 into substantially the position shown in Fig. 3, the bracket thus folded forming a T which occupies but very little space and does not seriously interfere with use of the desk for ordinary purposes. When it is desired to use the instrument, it may be grasped and readily moved toward the user so as to extend the supporting arm, as in Figs. 1 and 2. As above noted, the supporting arm may be readily turned about the standard 5 so as to hold the instrument in any desired or convenient position for use. As all of the parts of this bracket are of standard construction, they may be readily produced at very small cost and without necessitating the use of specially designed machinery.

It will be evident that there may be slight changes made in the construction and arrangement of the details of my invention without departing from the field and scope of the same, and I intend to include all such variations as fall within the scope of the appended claim, in this application in which a preferred form only of my invention is disclosed.

What I claim is:

In a telephone bracket, the combination of a base adapted to be attached to a desk and having an upstanding standard; of a T-shaped coupling whose shank is revolubly mounted on said standard and whose head is tubular and closed at one end, a series of tubular members successively smaller throughout the series and telescopically mounted within each other and within said head, the head and each member having an eye depending from it near its outer end and adapted to strike the end of the next larger member when the parts are collapsed, a chain connecting all of said eyes to limit the distention of the members, and means at the outer end of the outermost member for carrying the telephone instrument.

In testimony whereof I affix my signature in presence of two witnesses.

EDWARD T. JONES.

Witnesses:
 E. J. ZEIDLER,
 E. L. COMMAGERE.